June 19, 1934.　　　E. F. HOLINGER　　　1,963,328
ELECTRIC HEATER
Filed July 25, 1928　　2 Sheets-Sheet 1
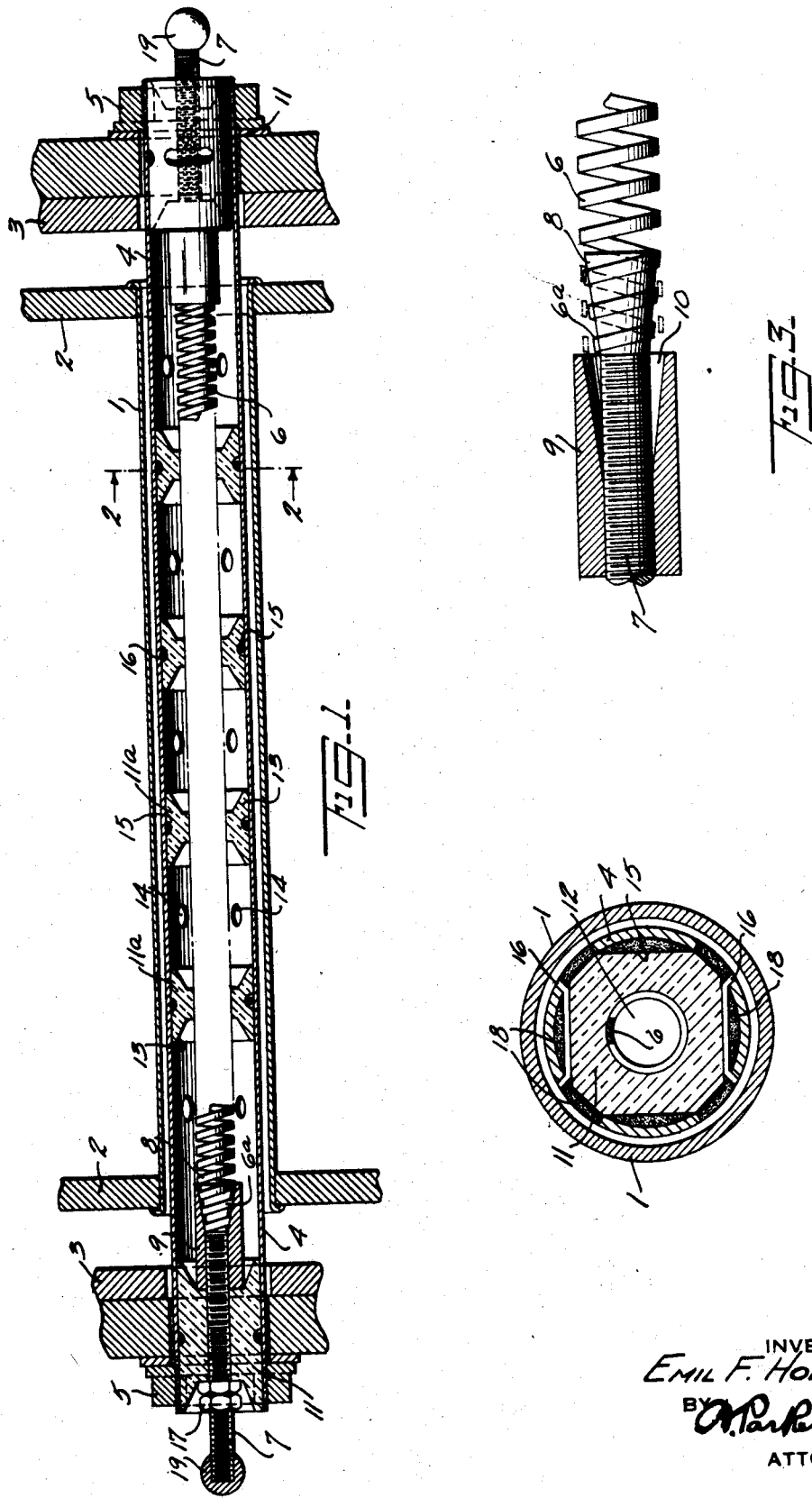
INVENTOR
EMIL F. HOLINGER
BY
ATTORNEY

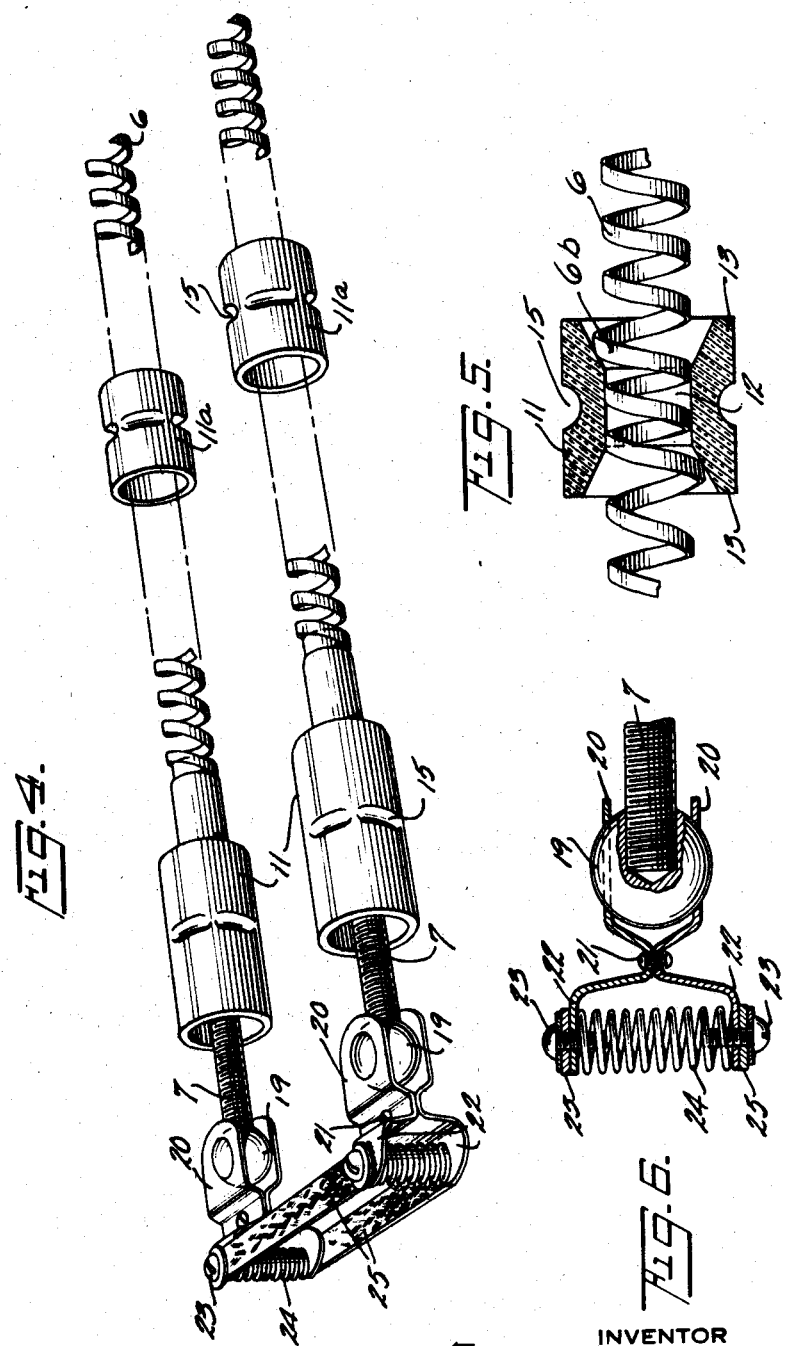

Patented June 19, 1934

1,963,328

UNITED STATES PATENT OFFICE 1,963,328

ELECTRIC HEATER

Emil F. Holinger, New York, N. Y., assignor to Hudson Electrical Heating Corporation, New York, N. Y., a corporation of New York Application July 25, 1928, Serial No. 295,133

7 Claims. (Cl. 219—19)

This invention relates to electric heaters generally but is more particularly designed to produce a convenient heating unit which can be easily inserted in or removed from the tube of a tubular boiler or hot water heater. Among the objects of the invention may be mentioned the production of a heating unit which will be highly efficient, effectively insulated and very resistant to fracture from shocks such as those to which an electric heater is continuously subjected when installed or an electric locomotive. The best form of apparatus at present known to me embodying my invention is illustrated in the accompanying two sheets of drawings in which Fig. 1 is a detail axial section through one tube of a tubular boiler and part of the casing for said boiler, showing the heating unit installed therein, parts being broken away and the support for the resistance coil at the right hand end being shown in elevation.

Fig. 2 is a cross section on line 2—2 of Fig. 1, on an enlarged scale.

Fig. 3 is a detail section showing the method of fastening the ends of the resistance coil to its supports.

Fig. 4 is a perspective view showing portions of two of the heating units and the connectors therefor.

Fig. 5 is a detail section through one of the insulating buttons showing the coil slightly expanded to prevent the button sliding endwise therein, and Fig. 6 is a vertical cross section through one of the connector clamps.

Throughout the drawings like reference characters indicate like parts.

1 represents the tube of a tubular boiler or heater mounted in the boiler heads 2, 2, with its outer ends expanded to make water tight joints therewith in the usual way. 3, 3, are the customary casing heads for the boiler, usually comprising non-heat-conducting material. 4 is the outer tube or casing of the heating unit, which has a series of spaced apart perforations 14, 14, in its wall. This tube 4 is usually made of metal, and is held in position by the exterior nuts 5, 5, threaded onto its ends which project beyond the casing heads 3, 3.

6 is a coil of resistant, electrically conductive material such as a nichrome steel which preferably is slightly malleable so that portions of it can be bent into any desired form.

7, 7, are threaded bolts mounted in spools of refractory insulating material 11, 11, which fit snugly into the ends of heater tube 4. Preferably these bolts have outwardly flaring heads 8, 8, and nuts 9, 9, threaded on them adjacent said heads, said nuts being provided with outwardly flaring recesses 10, 10, having the same angle of flare as the bolt heads 8, 8. These bolts and their supporting refractories are so placed in the tube 4 that the bolt heads 8, 8, are inside of the tube, while the other ends of the bolts which carry the spherical nuts 19, 19, are outside of the tube. The bolts 7 are clamped in the spools 11, by means of exterior nuts 17, cooperating with the interior nuts 9.

The ends of the heating coil 6 are clamped between bolt heads 8 and nuts 9, as shown, and the coil is supported at intermediate points by buttons 11a of refractory insulating material which are similar to spools 11, 11, except that they may be made shorter as shown. All of these buttons have projecting flanges 13, 13, at either end preferably of outwardly tapering cross section, as shown, and are also provided with transverse exterior grooves or keyways 15, 15. Some form of keying means are employed to hold spools 11 and buttons 11a in place in tube 4. Thus 16, 16, represent keys which may be formed of somewhat flexible wire of a length sufficient to allow them to rest in keyways 15, 15, with their ends projecting into certain of the holes 14 in tube 4, as best shown in Fig. 2. Bodies of cement 18, 18, are then pressed in through holes 14, after keys 16 have been placed in position, to fill the holes 14, and occupy portions of grooves 15, 15, around keys 16, 16. When this cement sets, the keys are obviously locked in position, and each of the spools 11 or buttons 11a thereby held against any sliding movement in tube 4. These keys could be formed and mounted in position by threading a continuous wire through the holes and grooves and then clipping off the wire even with the exterior surface of the tube 4.

In assembling the elements of the heating unit, the buttons 11a are strung on the coil 6, the bore 12 of the buttons being of sufficient diameter to permit the buttons to slide easily over the coil. When the buttons are located in the desired spaced-apart position they are fastened in these positions by slightly expanding certain of the coils of the conductor 6 by giving the coil a twist in a direction which will slightly expand the coil sections at either end of each spool, as illustrated in Fig. 5. The ends of the coil are then slipped over the flaring heads 8 of bolts 7, and pressed down into contact therewith, as shown at 6a in full lines in Fig. 3. The nuts 9 are then screwed out so as to surround the bent ends 6a of the coils and the bolt heads 8, the coil ends being thus firmly clamped between said bolt heads and nuts, as clearly shown at the left hand end of Fig. 1. The exterior nuts 17, are then set up, thus clamping spools 11, 11, in position at either end of the coil and said coil and all said spools and buttons are inserted in tube 4 and locked therein by means of keys 16, as best shown in Fig. 2. The heating unit so formed is then inserted through the openings in the casing of the boiler and through a boiler tube 1, and clamped in position by nuts 5, 5.

To connect up a series of units in circuit, the spherical nuts 19, 19, are screwed onto the projecting ends of bolts 7, 7, and the connector clamps shown in Figs. 4 and 6 are applied to said spherical heads.

These connector clamps each comprise essentially two clamping members 20, 20, pivoted together by a hinge screw 21 and having outwardly projecting handles 22, 22. The inner ends of the clamping members have circular perforation opposite one another of a diameter less than the diameter of the spherical nuts 19 so that said spherical heads may project part way into and rest in the said circular perforations in the jaw members when the latter are closed upon the nuts 19, as shown in Fig. 4. This closing action of the clamps is yieldingly produced by spiral compression springs 24, 24, confined between the clamped handles 22, 22. Preferably these springs are prevented from slipping out from between the handles by means of screws 23, 23, mounted in said handles and having their ends projecting through the same and part way into the springs, as best shown in Fig. 6. Flexible conductors 25, 25, are preferably formed of woven material which may be perforated so that screws 23, 23, may pass through them, as shown in Fig. 6, and thereby act as contact screws assuring a low resistance circuit from connectors 25, through clamps 20 and bolts 7 to heating coils 6.

The advantages of the construction above described comprise the efficient support of the heating coil, its effective insulation from the tube 4 by the spools 11 and buttons 11a, the projecting rims 13, 13, of which act like the skirts of high tension insulators in that they provide an inner, extended surface of the insulating mass, which surface is protected from the accumulation of moisture or other material which might be deposited from the atmosphere thereon to form a conducting film, and the solidity of the refractory units employed, which latter will hold the heating coil securely without being liable to fracture themselves, either by unequal expansion or contraction of the parts or by the impacts resulting from a rigid electric locomotive usually supported by very stiff springs, pounding and jolting over frogs, switches and rail joints in its operation. If the tube 4 expands more rapidly than the spools 11, and buttons 11a, under the application of heat, the radially projecting ends of the keys 16 will merely slip back and forth in the holes 14, without materially fracturing the surrounding body of cement and without any possibility of the keys being displaced so they can fall out. Even if some of said keys are sufficiently displaced to come in contact with boiler tube 1, no short circuit is produced because the heating coil and its connections are still completely insulated from tube 4 by spools 11, and buttons 11a.

The flexible system of connectors shown can easily be attached to or disconnected from any heating unit and the connectors can be manufactured of great length with the clamps spaced a standard distance apart on them, and the necessary length of the structure cut off for use on any given job. The clamps may be twisted around on spherical nuts 19, 19, without reducing the area of contact therewith.

Among the advantages of operation may be mentioned the free circulation of air through the casing head compartment, boiler tube 1, openings 14, and interiors of tubes 4, and in intimate contact with heating coils 6, all of the interiors of tube 4 being connected into one compartment through the openings 12 in the spools 11a. Such free circulation of air results in rapid transfer, by means of heated air, of the heat generated in the coils 6 to boiler tubes 1 and tube plates 2, 2, thus preventing overheating of any coil 6, or any portion of any of said coils.

Having described my invention, I claim:

1. In an electrical heater, a tubular member, a tube having perforations in its walls, said tube being concentrically disposed within and spaced from the interior wall of said tubular member, said perforations having relatively considerable total area sufficient to permit free air circulation through the wall of said tube and around the space between the outer surface of said tube and the inner surface of said tubular member, a series of buttons of refractory non-conducting material located at spaced distances apart in and closely fitting said tube interior, and a resistance conductor of electricity threaded through said buttons and thereby held out of contact with said tube, said conductor having no other support intermediate of its ends.

2. A combination such as defined in claim 1 in which said conductor is coiled into a spiral the outer diameter of which is substantially equal to the inner diameter of said buttons.

3. A structure such as defined in claim 1 in which said buttons have exterior grooves, combined with a series of keys passing through said grooves and through certain of the holes in the walls of the surrounding tube.

4. A structure such as defined in claim 1 in which said buttons have exterior grooves, combined with a series of keys passing through said grooves and through certain of the holes in the walls of the surrounding tube, together with bodies of cement in said grooves surrounding said keys.

5. A combination such as defined in claim 1 in which said buttons have axially projecting flanges at each end spaced away from said conductor.

6. In an electric heater the combination of a coil of flexible wire, and a button of insulating material having a bore of about the same diameter as that of the exterior of said coil, through which bore said coil is threaded, portions of the coil near either end of said button being slightly expanded in diameter to form a tight fit with a portion of said button bore.

7. In an electric heating unit the combination of a tubular supporting casing, a series of buttons of insulating material located in spaced-apart positions in said tube, an electrical conductor threaded through said buttons but out of contact with said casing and radially projecting keys mounted in the said buttons and passing through perforations in said tube wall.

EMIL F. HOLINGER.